United States Patent
Lim et al.

(10) Patent No.: US 11,253,908 B2
(45) Date of Patent: Feb. 22, 2022

(54) ULTRASONIC RIVET JOINING OF DISSIMILAR MATERIALS

(71) Applicant: UT-Battelle LLC, Oak Ridge, TN (US)

(72) Inventors: Yong Chae Lim, Oak Ridge, TN (US); Zhili Feng, Oak Ridge, TN (US); Jian Chen, Oak Ridge, TN (US); Xin Sun, Oak Ridge, TN (US); Richard W. Davies, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 110 days.

(21) Appl. No.: 16/858,770

(22) Filed: Apr. 27, 2020

(65) Prior Publication Data
US 2021/0129207 A1 May 6, 2021

Related U.S. Application Data

(60) Provisional application No. 62/931,387, filed on Nov. 6, 2019.

(51) Int. Cl.
*B32B 41/00* (2006.01)
*B21J 15/02* (2006.01)
(Continued)

(52) U.S. Cl.
CPC .......... *B21J 15/027* (2013.01); *B29C 65/645* (2013.01); *B29C 66/1122* (2013.01); *B29C 66/7212* (2013.01); *F16B 5/04* (2013.01)

(58) Field of Classification Search
CPC ..... B21J 15/027; B21J 5/066; B29C 66/1122; B29C 66/7212; B29C 65/645; F16B 5/04; B21K 25/005
(Continued)

(56) References Cited

U.S. PATENT DOCUMENTS 8,595,914 B2 12/2013 Koppitz et al.
9,937,548 B2 4/2018 Clarke et al.
(Continued)

FOREIGN PATENT DOCUMENTS

| CN | 105643090 A | 6/2016 |
| DE | 10124920 A1 | 10/2002 |
| GB | 2534282 A1 | 7/2016 |

OTHER PUBLICATIONS

Satpathy, M. P. et al. "Ultrasonic spot welding of dissimilar materials: characterization of welded joints and parametric optimization." IOP Conference Series: Materials Science and Engineering. vol. 115. No. 1. IOP Publishing, 2016.

*Primary Examiner* — Michael N Orlando
*Assistant Examiner* — Joshel Rivera
(74) *Attorney, Agent, or Firm* — Warner Norcross + Judd LLP

(57) ABSTRACT

A method for joining dissimilar materials is provided. The method includes a solid-state joining process in which a rivet is plunged into a predrilled hole in a top workpiece. When the rivet contacts the bottom workpiece, ultrasonic vibration by oscillatory motion of a sonotrode, such as horizontal, vertical, or rotational motion, creates frictional heat at the interface between the rivet and the lower workpiece. With the aid of frictional heat and axial compression, metallurgical bonding is achieved at the interface between the rivet and the bottom sheet, while being below the melting temperature of the bottom workpiece. The sonotrode is retracted while the rivet remains.

11 Claims, 5 Drawing Sheets

(51) Int. Cl.
 *B29C 65/00* (2006.01)
 *F16B 5/04* (2006.01)
 *B29C 65/64* (2006.01)

(58) Field of Classification Search
 USPC .................... 156/60, 64, 350, 351, 378, 379
 See application file for complete search history.

(56) References Cited

U.S. PATENT DOCUMENTS

| | | |
|---|---|---|
| 10,035,216 B2 | 7/2018 | Wisniewski |
| 10,189,075 B2 | 1/2019 | Wang et al. |
| 2009/0317179 A1 | 12/2009 | Christ et al. |
| 2018/0094660 A1* | 4/2018 | Mayer ..................... B21J 15/36 |

* cited by examiner

ULTRASONIC RIVET JOINING OF DISSIMILAR MATERIALS

CROSS-REFERENCE TO RELATED APPLICATIONS

This application claims the benefit of U.S. Provisional Application 62/931,387, filed Nov. 6, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to riveting systems to join dissimilar workpieces with one another.

BACKGROUND OF THE INVENTION

The joining of dissimilar materials faces many technical challenges due to possible physical and chemical incompatibility, particularly in automotive and transportation applications. The present invention addresses these challenges with a proposed spot joining method to bond different metallic materials, or the bonding of a metallic material to a non-metallic material, such as a carbon fiber reinforced polymers.

For example, multi-material body panels are an important tool in the light-weighting of automobiles. To achieve this goal, aluminum, magnesium, titanium alloys, high strength steel alloys, or polymer composites are preferred over traditional steel components. However, the joining of dissimilar materials presents technical barriers for mass production. Conventional fusion welding or mechanical fastening may not be suitable for joining dissimilar materials. For example, conventional resistance spot welding (RSW), while widely used in the automotive industry, can create brittle intermetallics and large residual stresses during heating and cooling cycles, which can lead to degradation of joint strength over time. Also, this RSW process cannot be applied for certain dissimilar materials, especially for polymer composites, as it is not possible to pass current to produce resistance heating at the interface between metal and polymer composites. Another example is self-piercing riveting (SPR), which is a cold joining method in which a rivet is driven by a press tool towards a die to join a top workpiece to a bottom workpiece, causing the rivet to flare into the bottom workpiece. However, this process has limitations on the material strength (typically tensile strength is less than 780 MPa) and low ductility materials (e.g., magnesium alloy, high strength aluminum).

Accordingly, there remains a continued need for an improved method in which dissimilar materials can be joined together, including materials with low ductility and high strength and non-metallic materials such as carbon fiber reinforced polymers.

SUMMARY OF THE INVENTION

A method for joining dissimilar materials is provided. In one embodiment, the method includes a solid-state joining process in which a rivet is plunged into a predrilled hole in a top workpiece. When the rivet contacts the bottom workpiece, ultrasonic vibration by oscillatory motion of a sonotrode, such as horizontal, vertical, or rotational motion, creates frictional heat at the rivet-workpiece interface. With the aid of frictional heat and axial compression, metallurgical bonding is achieved at the interface between the rivet and the bottom workpiece, while being below the melting temperature of the bottom workpiece. The sonotrode is retracted while the rivet remains.

In one embodiment, metallurgical bonding is achieved at temperatures below the melting point of the workpiece material by controlling the power level of the sonotrode, or by controlling the duration, amplitude, and/or frequency of oscillations, which are variable. The method can include monitoring the temperature of the interface between the rivet and the bottom sheet to ensure the absence of melting. Alternative techniques include monitoring for a change in sonotrode power consumption, which can indicate the onset of melting, which lowers the coefficient of friction at the interface.

As discussed herein, the metallurgical incompatibility of dissimilar materials (e.g., the top workpiece and the bottom workpiece) is overcome because metallurgical bonding between the rivet and the bottom workpiece is the primary bonding mechanism. If the same material for the rivet and the bottom sheet are used, strong diffusion bonding can be achieved, potentially leading to an increase in joint strength. In addition, ultrasonic vibration energy (in one embodiment) is only focused on the rivet for joining dissimilar workpieces, such that joint strength degradation for nearby joints can be minimized. Further, based on the rivet's dimensions, a multi-layered structure of more than two workpieces are possible, including both metallic materials and carbon fibers.

These and other features and advantages of the present invention will become apparent from the following description of the invention, when viewed in accordance with the accompanying drawings and appended claims.

DETAILED DESCRIPTION OF THE CURRENT EMBODIMENTS

As discussed herein, the current embodiments generally relate to a method for joining dissimilar materials using ultrasonic vibrational energy to form a metallurgical bond between a rivet and a workpiece. The method according to one embodiment generally includes positioning a rivet in a pre-formed hole in an upper workpiece, the upper workpiece being adjacent a lower workpiece and each being formed of different materials. The method further includes applying ultrasonic vibrations to the rivet to form a metallurgical bond between the rivet and the lower workpiece and simultaneously driving the self-piercing rivet toward the lower workpiece, thereby joining the workpieces together without melting at the interface between the rivet and the lower workpiece. Each step is separately discussed below.

Figure 1:
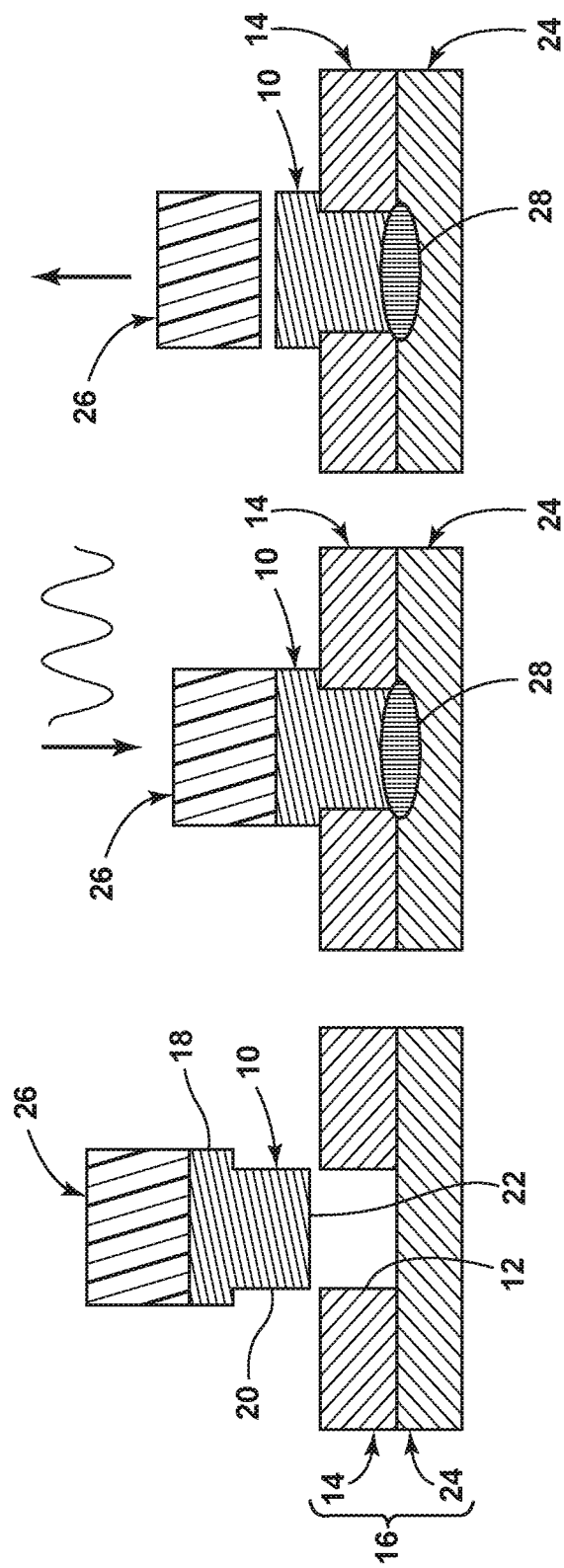
FIG. 1 is a schematic representation of a method for joining dissimilar materials in accordance with the present invention.

Referring to FIG. 1, positioning a rivet into a pre-formed hole generally includes inserting the rivet 10 into a pre-drilled through-hole 12 in the upper workpiece 14 of a workpiece stack 16. The rivet 10 includes a widened head 18 and a solid cylindrical shank 20 that terminates in a solid tip end 22. The length of the shank 20 is selected based on the thickness of the upper workpiece 14, such that the length of the shank 20 is approximately equal to the thickness of the upper workpiece 14. In addition, and the outer diameter of the shank 20 is selected to closely correspond with the inner diameter of the through-hole 12. The outer diameter of the widened head 18 is greater than the inner diameter of the through-hole 12, such that the rivet 10 does not fully penetrate the lower workpiece 24 of the workpiece stack 16. Though not shown in FIG. 1, an optional material can be disposed between the upper workpiece 14 and the lower workpiece 24, discussed more fully in connection with FIG. 2 below.

Once positioned within the pre-drilled through-hole 12 in the upper workpiece 14, a sonotrode 26 applies ultrasonic vibrations to the rivet 10, directly or indirectly, to form a metallurgical bond 28 at the interface between the rivet 10 and the lower workpiece 24. The sonotrode 26 can include a piezo-electric transducer operable to vibrate at ultrasonic frequencies, for example frequencies of greater than 20 kHz, further optionally between 20 kHz and 80 kHz, still further optionally between 20 kHz and 60 kHz, with the amplitude of vibration optionally in the range of 2-100 μm, optionally 2-40 μm. In one embodiment, the sonotrode 26 directs continuous ultrasonic vibrations to the rivet 10 for at least the length of time that the sonotrode 26 or a press tool (not shown) compresses the rivet 10 towards the lower workpiece 24. In other embodiments, continuous ultrasonic vibrations are applied to the rivet 10 prior to the rivet 10 being compressed by the sonotrode 26. In still other embodiments, continuous ultrasonic vibrations are applied to the rivet 10 at least prior to and while to the rivet 10 is compressed by the sonotrode 26. In still other embodiments, the rivet 10 is not compressed and only the ultrasonic vibrations are responsible for forming the metallurgical bond 28 at the rivet-workpiece interface. The ultrasonic vibrations can be applied in the lengthwise direction of the rivet 10, perpendicular to the lengthwise direction of the rivet 10, or rotatively about the lengthwise direction of the rivet 10.

The ultrasonic vibrations propagate through the rivet 10 to the rivet-workpiece interface. Metallurgical bonding due to friction at the rivet-workpiece interface occurs at temperatures below the melting point of the lower workpiece 24. To ensure this melting point is not reached, the present method can control the vibrational energy at the rivet-workpiece interface by limiting the duration, amplitude, duty cycle, and/or frequency of oscillations of the sonotrode 26, and/or by limiting the axial pressure applied to the rivet 10. Controlling the vibrational energy at the rivet-workpiece interface is optionally performed as part of an open-loop control function or a closed-loop control function to ensure the temperature at the interface is less than the melting temperature of the lower workpiece 24. In an open-loop control function, the control action (the vibration of the sonotrode and/or the axial pressure applied to the rivet) can be based on predetermined parameters for a given rivet material and a given lower workpiece material. In a closed-loop control function, the control action (the vibration of the sonotrode and/or the axial pressure applied to the rivet) can be dependent on feedback in the form of a process variable. The process variable can include the localized temperature at the interface as measured by a thermocouple or an infrared sensor, with the localized temperature being compared with a reference value (a preset temperature threshold). The process variable can alternatively include the power (e.g., current) being drawn by the sonotrode, particular as a drop in the electrical load can be indicative of a decrease in the coefficient of kinetic friction (caused by pre-melting) at the rivet-workpiece interface. Still further optionally, the process variable can include the output of a transducer to detect a change in the amplitude of vibrations that are indicative of a decrease in the coefficient of kinetic friction at the rivet-workpiece interface. In these examples, the process variable is compared with a reference value for creating an error signal for controlling the vibration of the sonotrode and/or the axial pressure applied to the rivet to ensure melting does not occur at the rivet-workpiece interface.

Once the metallurgical bond 28 is formed at the rivet-workpiece interface, while being below the melting temperature of the lower workpiece 24 and rivet 10, the sonotrode 26 is removed and the upper workpiece 14 remains clamped against the lower workpiece 24 by the rivet head 18. In some embodiments, the rivet 10 and the lower workpiece 24 are formed of the same material, providing strong diffusion of bonding at the rivet-workpiece interface. Because ultrasonic vibrational energy is only focused at the rivet 10 in this embodiment, and not the upper workpiece 14 or the lower workpiece 24, joint strength degradation for the adjacent joints is minimized. Examples include a lower workpiece 24 formed of steel or steel alloy, an upper workpiece 14 formed of aluminum or aluminum alloy, and a rivet 10 formed of steel or steel alloy. Still further examples include a lower workpiece 24 formed of steel or steel alloy, an upper workpiece 14 formed of magnesium or magnesium alloy, and a rivet 10 formed from aluminum. The upper workpiece 14 can also include a non-metal material, for example carbon fiber reinforced polymers. For example, the upper workpiece 14 can include a carbon fiber reinforced polymer, the lower workpiece 24 can be formed of magnesium alloy, and the rivet 10 can be formed of magnesium alloy. The upper workpiece 14 and the lower workpiece 24 do not include dissimilar materials in all embodiments, and in some embodiments the upper workpiece 14 and the lower workpiece 24 include similar or identical materials.

Figure 2:
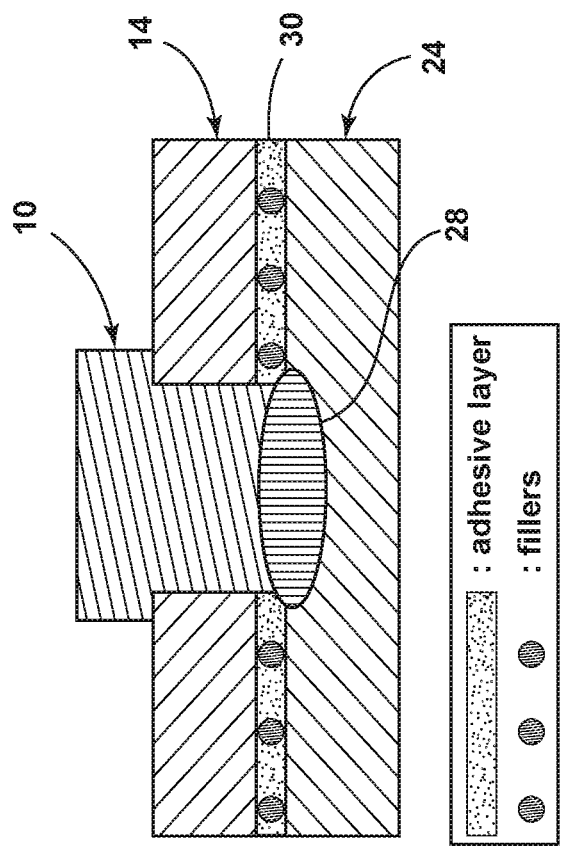
FIG. 2 is a schematic representation of an adhesive layer interposed between an upper workpiece and a bottom workpiece.

Galvanic corrosion, where two different materials are physically contacted under the presence of a corrosion medium, is a potential concern with dissimilar joints. The method of the present invention can include an adhesive layer 30 with or without fillers to maintain an adhesive bondline thickness, which can act as an insulation barrier 30, as shown in FIG. 2. In this regard, the insulation barrier prevents direct physical contact of the upper workpiece 14 and the lower workpiece 24. In addition, the adhesive layer 30 at the joint between the upper and lower workpieces 14, 24 serves as a barrier for the infiltration of a corrosion medium. Therefore, galvanic corrosion resistance of dissimilar materials can be significantly improved. Further, the adhesive layer at the joint can contribute to improved joint strength by uniformly sharing stresses. The adhesive layer 30 can be formed over the entire upward-facing surface of the lower workpiece 24, the entire lower-facing surface of the upper workpiece 14, or both the entire upward facing surface of the lower workpiece 24 and the entire lower-facing surface of the upper workpiece 14, less the region of the lower workpiece 24 underlying the through-hole 12 in the upper workpiece 14. The insulation barrier can include, for example, a polyester-based resin pre-coating, or a silicone elastomer, for suppressing galvanic corrosion.

Figure 3:
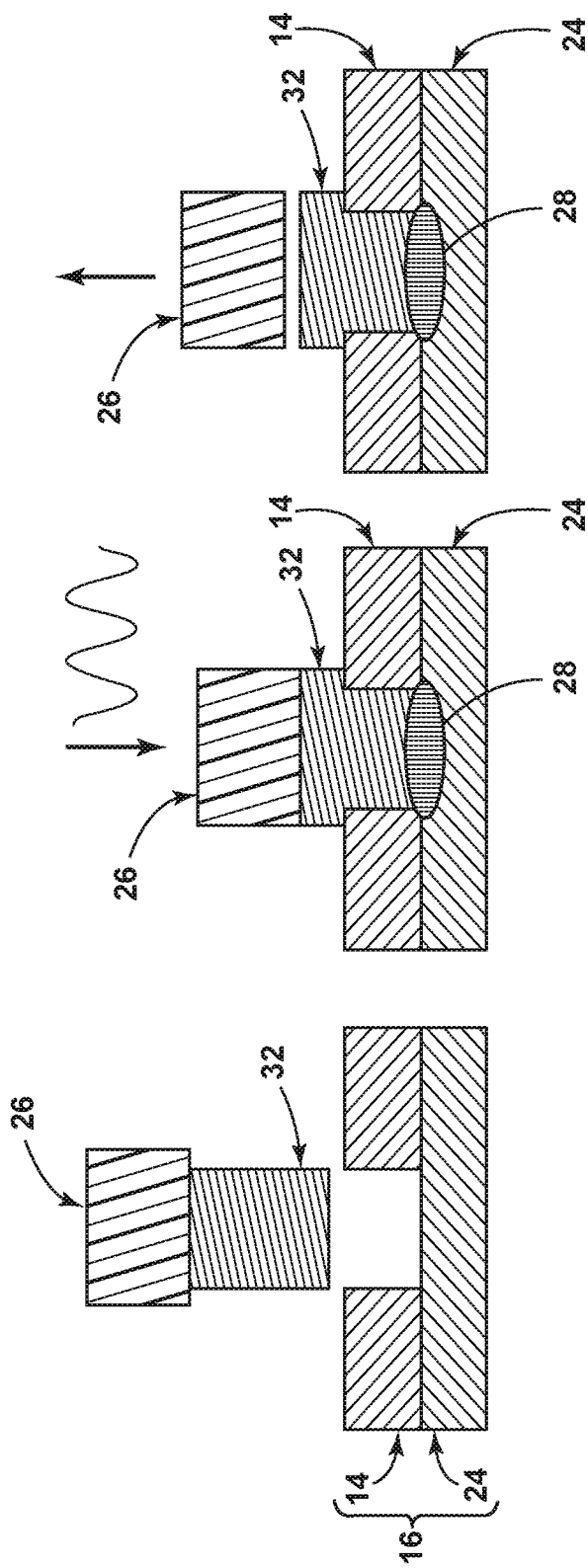
FIG. 3 is a schematic representation of a method for joining dissimilar materials including a rod-type rivet.
Figure 5:
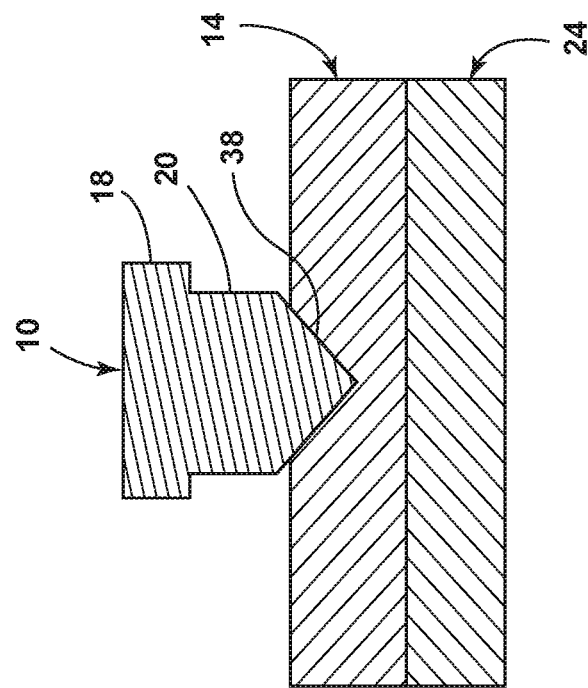
FIG. 5 is a schematic representation of a rivet head with a tapered stem for use with the method of the present invention.
Figure 4:
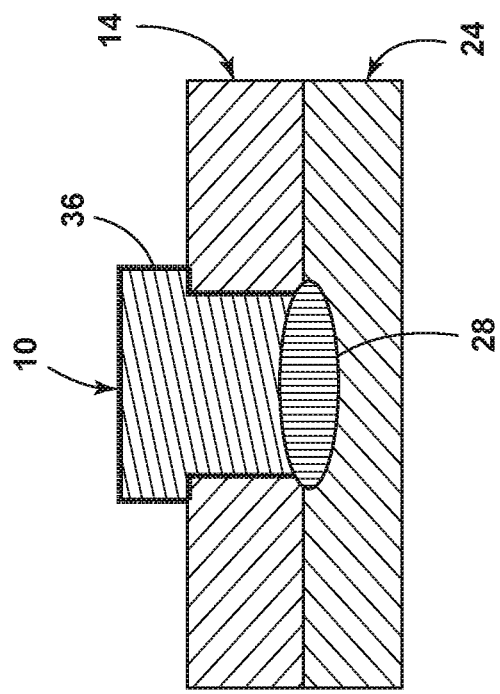
FIG. 4 is a schematic representation of a rivet head with an optional coating to prevent a galvanic circuit.
Figure 6:
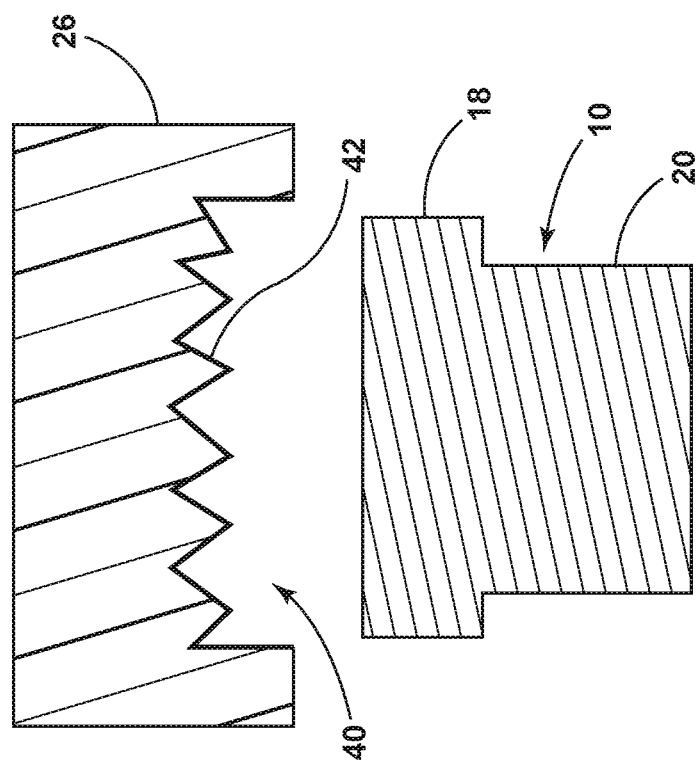
FIG. 6 is a schematic diagram of a sonotrode to externally drive a rivet for joining dissimilar materials.

As optionally shown in FIG. 3, a rod-type rivet 32 can be used with the method of the present invention. Friction heat and axial compression can deform the top of the rod-type rivet 32, creating a deformed rivet head 34, leading to the mechanical locking by compression. That is, the upper portion of the rod-type rivet 32 does not pass through the opening 12 in the upper workpiece 14 in this embodiment, but flattens and sandwiches the upper workpiece 14 between itself and the lower workpiece 24. As further optionally shown in FIGS. 4 and 5, the rivet 10 can include coatings 36 and can be pre-machined with various shapes for different applications. Suitable coatings include a polymer, an adhesive, and/or a ceramic, optionally to serve as an insulation layer between the rivet and the adjacent material to prevent a galvanic circuit (however the tip end of the river generally remains uncoated). The coating 36 can be softened or melted by the ultrasonic vibrations (even as the lower workpiece and rivet do not melt) and flow into the pre-drilled polymer composite or metal upper workpiece 14 to heal any micro-cracks producing during the drilling of the upper workpiece 14. In addition, the coating 36 can form a metallurgical bond with the sidewall 14 of the upper workpiece opening 12, resulting in an additional joint strength increment. As also noted above, a rivet 10 having a tapered tip end 38 can be used to eliminate the step of pre-forming the opening in the upper workpiece 14. Axial loads from the sonotrode 26 (or a press tool) can cause the tapered rivet 38 to plunge into the composite upper workpiece 14, particularly for carbon fiber reinforced polymers, thereby eliminating pre-drilling operations. As optionally shown in FIG. 6, the sonotrode 26 can include a socket opening 40 to externally hold the rivet 10 and apply a uniform pressure into the rivet 10. The socket opening 40 can include a surface texture 42 on the axial face to grip the rivet head 18 and to more effectively facilitate the ultrasonic bonding.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method comprising:
    positioning a first workpiece over a second workpiece, the first workpiece being formed of a material different from that of the second workpiece;
    positioning a rivet in a through-hole in the first workpiece, the rivet including a head and a shank, the shank terminating at a flat tip end, the head overlapping a portion of the first workpiece and the shank extending entirely through the through-hole such that the flat tip end of the shank abuts an upward-facing surface of the second workpiece;
    applying ultrasonic vibrations to the rivet to form a metallurgical bond at an interface between the flat tip end of the rivet shank and the upward-facing surface of the second workpiece without exceeding a melting temperature of the second workpiece or the shank at the interface and without penetrating the second workpiece;
    monitoring a process variable that is indicative of the temperature at the interface and controlling the application of ultrasonic vibrations to the rivet based on the monitored process variable to prevent melting at the interface; and
    allowing the metallurgical bond to cool while the first workpiece remains clamped to the second workpiece by the rivet head, the flat tip end of the rivet being integrally joined to the upward-facing surface of the second workpiece via the metallurgical bond.

2. The method of claim 1 further including providing a sonotrode to apply the ultrasonic vibrations to the rivet.

3. The method of claim 1 wherein applying ultrasonic vibrations includes applying ultrasonic vibrations in a direction parallel to a longitudinal axis of the rivet.

4. The method of claim 1 wherein applying ultrasonic vibrations includes applying ultrasonic vibrations in a direction perpendicular to a longitudinal axis of the rivet.

5. The method of claim 1 wherein applying ultrasonic vibrations imparts rotational vibrations about a longitudinal axis of the rivet.

6. The method of claim 1 further including applying an axial load to the rivet during the application of ultrasonic vibrations to the rivet.

7. The method of claim 1 further including applying an adhesive coating between the first workpiece and the second workpiece, such that the first workpiece does not directly engage the second workpiece to suppress galvanic corrosion therebetween.

8. The method of claim 1 further including applying a coating about the shank of the rivet, the coating including a polymer, an adhesive, or a ceramic to penetrate micro-cracks in an annular facing sidewall of the through-hole in the first workpiece.

9. The method of claim 2 wherein the sonotrode includes a socket opening having a textured surface to engage the rivet head during the application of ultrasonic vibrations.

10. The method of claim 1 wherein the first workpiece includes a carbon fiber reinforced polymer and the second workpiece includes a metallic material.

11. The method of claim 1 wherein the first workpiece includes a first metallic material and the second workpiece includes a second metallic material different from the first metallic material.

* * * * *